D. H. DOWNEY.
PRESSURE REGULATOR FOR AIR BRAKES.
APPLICATION FILED NOV. 30, 1909.
972,347.
Patented Oct. 11, 1910.
3 SHEETS—SHEET 1.
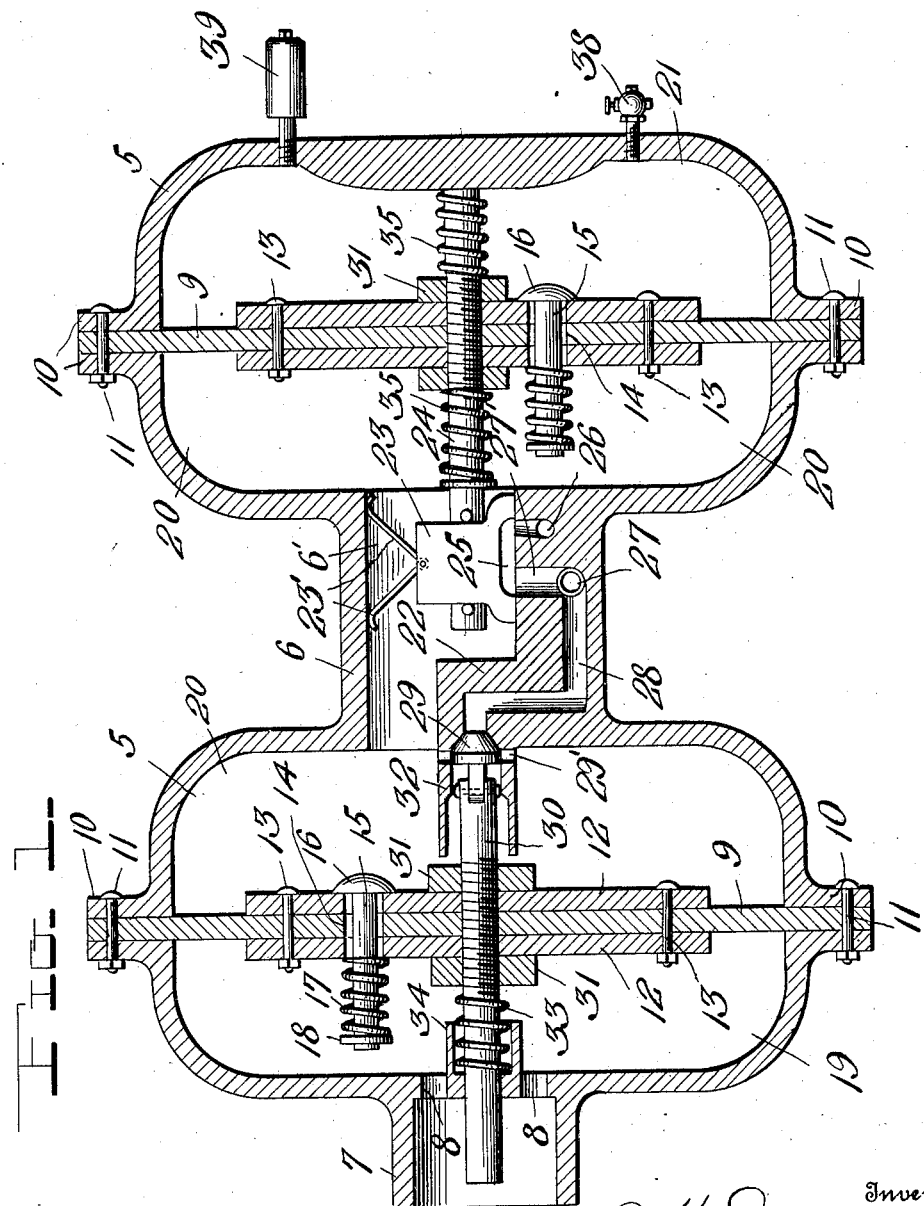

D. H. DOWNEY.
PRESSURE REGULATOR FOR AIR BRAKES.
APPLICATION FILED NOV. 30, 1909.
972,347.
Patented Oct. 11, 1910.
3 SHEETS—SHEET 2.
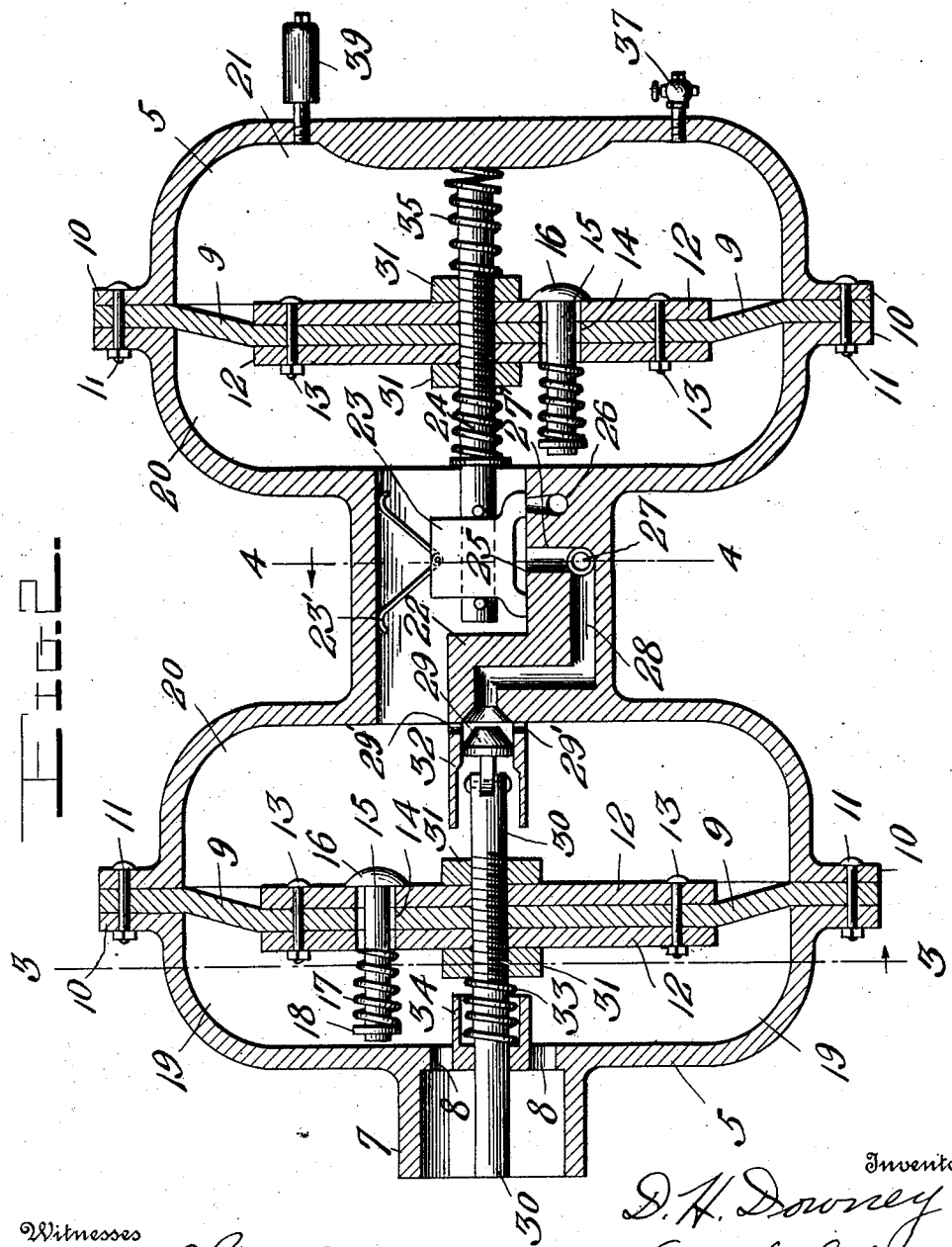

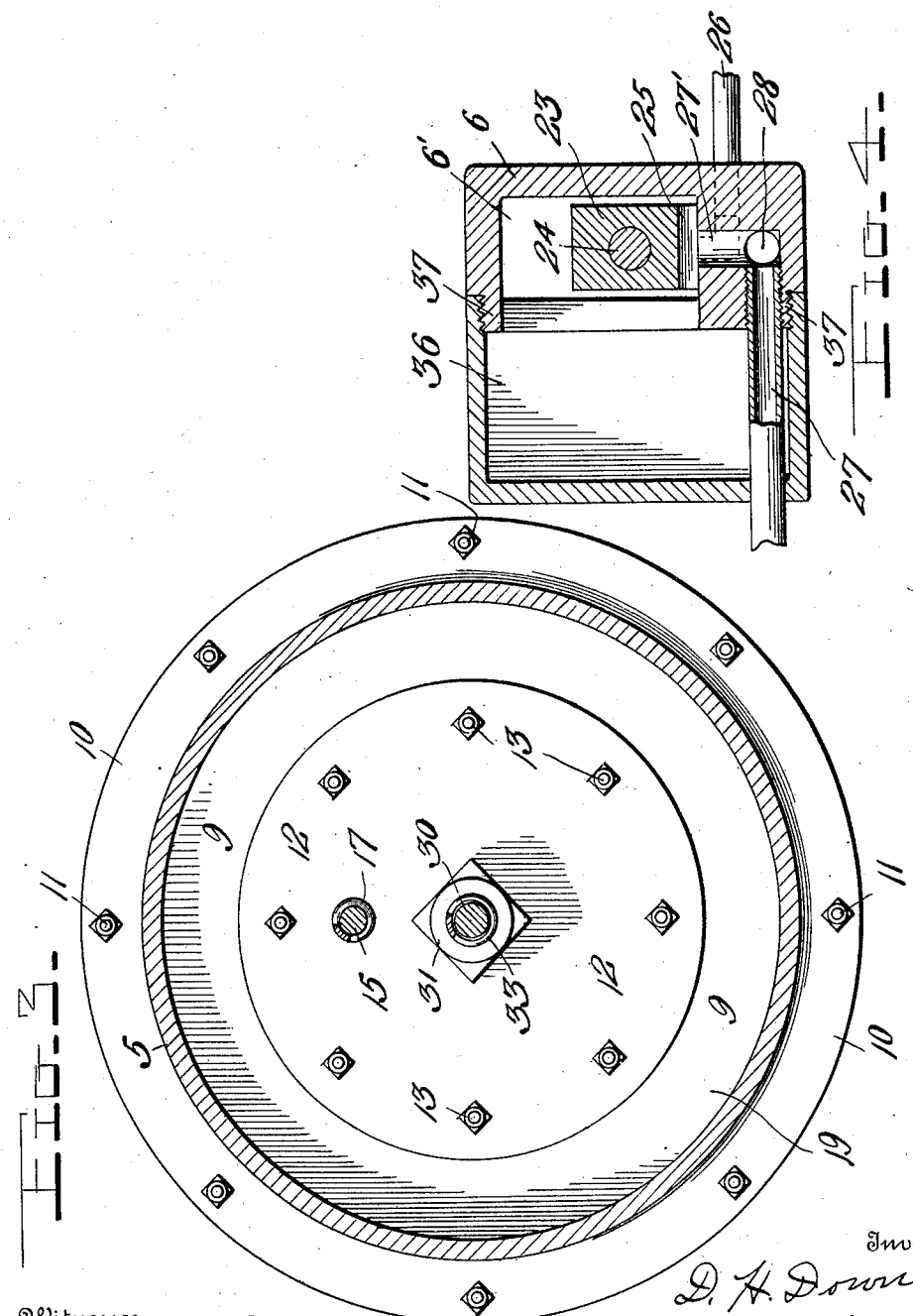

UNITED STATES PATENT OFFICE.

DAVID H. DOWNEY, OF BASALT, COLORADO.

PRESSURE-REGULATOR FOR AIR-BRAKES.

972,347.  Specification of Letters Patent. Patented Oct. 11, 1910.

Application filed November 30, 1909. Serial No. 530,637.

*To all whom it may concern:*

Be it known that I, DAVID H. DOWNEY, a citizen of the United States, residing at Basalt, in the county of Eagle and State of Colorado, have invented certain new and useful Improvements in Pressure-Regulators for Air-Brakes, of which the following is a specification, reference being had to the accompanying drawings.

This invention has relation to certain new and useful improvements in automatic pressure regulators for air brakes and is devised with a view to providing a device of this character which will automatically apply the brakes under the control of the operator, and hold them applied until the air has been completely exhausted from the train line pipe.

Another object is to provide a pressure regulator whereby sufficient air will at all times be available for applying the brakes and holding them in such position when the train is running on a steep grade.

A further object is to provide an automatically actuated sliding valve which is adapted to be moved to close an exhaust port and open communication between the regulator and the air brake cylinder, the valve maintaining such position until the pressure in the train line pipe has been raised by the engineer to its original pressure at the time the brakes were applied.

With these and other objects in view, the invention consists of the novel construction, combination and arrangement of parts hereinafter fully described and claimed, and illustrated in the accompanying drawings, in which—

Figure 1 is a vertical section through a pressure regulator constructed in accordance with the present invention; Fig. 2 is a similar view illustrating the position of the various parts when the brakes are applied; Fig. 3 is a section taken on the line 3—3 of Fig. 2; and Fig. 4 is a section taken in the line 4—4 of Fig. 2.

Referring to the drawings 5 indicates two end casings or housings which are integrally connected by the valve casing 6. For convenience each of these end casings are preferably formed in two sections. One of the casings 5 is formed with a central extension 7 to which the train line pipe is adapted to be connected. This extended portion has communication with the interior of the casing through a plurality of openings 8 in the wall thereof. Between the sections of the casings 5 a diaphragm 9 is disposed, the sections each being formed with an annular flange 10, the securing bolts 11 extending through these flanges and the diaphragm whereby the same may be secured in position. Upon the opposite faces of each of the diaphragms a circular plate 12 is disposed and is secured thereto by means of bolts 13. The diaphragms are provided with the openings 14 through which the valve stem 15 is disposed. This stem is of considerably less diameter than the openings and is provided upon one end with a head 16 which is disposed over and closes the openings in the plates and diaphragm. Spiral springs 17 are disposed upon the valve stems between one of the plates 12 and a nut or washer 18 secured on the outer end of each of the bolts. In both cases the construction and operation of this valve are identical and they are adapted to afford communication between the chambers 19 and 20 and chambers 20 and 21 respectively, which are provided by the sectional formation of the housings 5. The central chamber 20, however, is of much greater size than the chambers 19 and 21 and comprises one of the sections of each of the housings and the connecting valve portion 6 which is provided with a longitudinal passage way 6′ connecting the two housings. The valve casing 6 is formed with a vertical wall 22, said wall serving as a stop to limit the movement of a sliding valve 23 arranged in said casing. This valve is carried on the inner end of a rod or stem 24 and the base thereof is recessed or cut away as at 25 to form an air passage. A spring 23′ is secured to the valve 23 and bears upon the casing to retain the same in position on its seat. The valve 23 is normally disposed in the position shown in Fig. 1 wherein the exhaust port 26 and the outlet 27 which has communication to the brake pipe are both in communication with the recess 25 of the valve, a vertical connecting passage 27′ being provided in the valve casing 6 which extends from the laterally disposed port 28. This latter port extends through the lower solid portion of the valve casing and upwardly through the angular portion 22 thereof. This port communicates with one of the housings 5 and is normally closed by means of a frusto-conical valve 29. Openings 29′ admit the air to the port 28 when the valve 29 is unseated. This valve is pivoted to the inner end of a reciprocatory rod or stem 30 upon which the nuts 31 have threaded engagement and bear upon the plates 12. The valve member 29 is movable in a tubular casing 32 preferably formed integral with the valve casing 6. The stem 30 extends through the plates 12 and the diaphragm and projects through the housing wall into the extension 7. A coiled spring 33 is disposed about the rod between one of the nuts 31 and the inner wall of the housing, said spring being positioned in a tubular extension 34 formed thereon. The reciprocating valve stem 24 also has the springs 35 coiled about the same. These valve stems are reciprocated by the flexing of the diaphragms 9, due to the decrease of air pressure in the train line and the increase of pressure in the chambers 20 and 21, and the springs 33 and 35 are adapted to cushion the return of the diaphragms to their normal position and overcome any vibratory movement thereof.

The housings 5 and valve 6 are adapted to be connected to an auxiliary reservoir 36 which is also charged with compressed air from the train line pipe and is threaded on an extension 37 of the valve casing 6. A bleed cock 38 has communication with the chamber 21 and a safety valve 39 is also provided to obviate the possibility of too great a pressure in the chamber.

In the operation of the device the air enters from the train line connection into the chamber 19, and after sufficient pressure has accumulated therein it will overcome the tension of the valve spring 17 and open a communicating passage through the alined openings 14 in the plates 12 and diaphragm 9 by forcing the head 16 of the valve stem inwardly. Thus the air is admitted into the chamber 20 and also charges the auxiliary reservoir which has communication therewith. Upon the continued admission of air through the train line connection, the other of the valves 15 in the diaphragm is opened and the air admitted to the end chamber 21. These various chambers are all charged to the same pressure as that contained in the train line which is usually about eighty pounds, and the valves 23 and 29 are in the positions shown in Fig. 1 while the valves 15 carried by the diaphragms are closed, the pressure valve springs being equal to one pound tensile-strength. It will be noted that the equalization of the air pressure in these various chambers will maintain the valve 23 in its open position when the air brakes are not applied. In order to apply the brakes, the engineer reduces the train line pressure through suitable valves under his control, thereby also reducing in like proportion the air pressure in the chamber 19. As the pressure in the chamber 20 will then be greater than that in the chamber 19 and the train line connection and as the valve 15 in the diaphragm is closed, it will be obvious that this inequality in the air pressure will cause the diaphragm to flex or be moved to the position shown in Fig. 2. This movement of the diaphragm also moves the valve stem 30 which is rigidly connected thereto and unseats the valve 29, opening communication through the port with the chamber 20 and the auxiliary air reservoir 36 from whence it flows into the brake cylinder. This admission of the air into the brake cylinder continues until the pressure in the chamber 20 and the auxiliary reservoir is reduced to one pound below that of the train line, this being the tensile pressure of the valve spring 17. It will thus be seen that the diaphragm will be caused to return to its normal position and reseat the valve 29. During this operation the charge of compressed air in the chamber 21 which is held therein by the closure of the valve 15 causes a similar movement of the diaphragm in the other of the housings 5. This movement of the diaphragm was effected very shortly after communication was opened to the brake cylinder through the port 28 which caused an excess pressure in the chamber 21 thereby moving or sliding the valve 23 and closing the exhaust port 26. As the pressure in the chamber 21 is not released, it will be obvious that the valve 23 will be maintained in this position and the brakes applied until the pressure in the train line and chambers 19 and 20 is restored to its normal strength. Communication is now opened between the chamber 19 and the main air reservoir on the engine through the train line connection. This air passes the valve 15 into the chamber 20, and when the pressure in this latter chamber and the auxiliary reservoir has attained the same pressure as that in the train line it will be equal to the pressure attained in chamber 21. This equalization of the pressures will return the diaphragm in the end housing 5 to its normal position and slide the valve 23 to open the exhaust port 26 through which the air contained in the port 28 and brake cylinder may be readily exhausted, thus releasing the brakes.

From the foregoing it will be seen that I have provided an air pressure regulator which is of comparatively simple construction, is absolutely positive in its operation, and will absolutely hold the brakes applied under all conditions until the requisite pressure required to open the same is admitted to the various receiving chambers. As the admission of the air pressure to the regulator is controlled by the engineer it will be obvious that the constant danger of serious accident by the failure of the brakes to work, due to a deficiency of air pressure, especially upon steep grades, is entirely obviated. The strain upon the draft gearing and the jerking of the train coaches when a stop is made, is also largely overcome. It will further be apparent that after the first reduction of the train line pressure, the chambers 19, 20 and 21 will contain the same pressure of air on every car, and when released the highest pressure which is upon the brake pistons having the shortest stroke will be the first released.

The construction and arrangement of the various elements provide a regulator of the above character which is extremely durable and one whose operation is very positive.

While I have shown and described what I believe to be the preferred embodiment of my invention, it will be obvious that numerous minor modifications may be resorted to within the scope of the claims without materially departing from the essential features or sacrificing any of the advantages of the invention.

Having thus described the invention, what is claimed is:

1. A device of the character described comprising two casings, each formed in two sections, a valve casing integrally formed with the opposed sections of said first named casings, diaphragms secured between the sections of said casings to provide end chambers, said valve casing forming a communicating passage between the opposed casing sections and providing a central chamber, an air port opening into one of said chambers and communicating with the brake cylinder, an outlet port, connections between one of said casing sections and an air supply pipe, a reciprocatory valve normally closing said air port, a slide valve arranged in said valve casing and means for admitting air to each of said chambers whereby the pressure in said chambers may be so regulated as to cause the closing of said exhaust port and the opening of the air port to supply air to the brake cylinder.

2. A device of the character described comprising a casing having a plurality of air chambers therein, a valve seat formed in one of said chambers, a slide valve positioned thereon, an air port extending through the chamber wall and communicating with said chamber adapted to conduct air to the brake cylinder, an exhaust port opened and closed by said slide valve, a valve member closing the air port, a reciprocating valve stem connected to said member, one of said chambers being connected to a supply pipe adapted to charge the chambers with compressed air, means disposed between the chambers automatically operated by the variation of air pressure to operate said valve, and spring controlled valves in said operating means adapted to open communication between the chambers at certain times.

3. A device of the character described comprising a casing having a central chamber and end chambers, the central chamber being of greater area and formed with a contracted central portion and having an air port communicating with the air brake cylinder, a slide valve disposed upon a valve seat formed in the central portion of said casing and adapted to open and close an exhaust port, a valve member seated in the outer end of said air port, a valve stem pivotally connected to said member, a flexible diaphragm secured between said chambers adapted to automatically operate said valves to open and close communication between the central chamber and the brake cylinder, a supply pipe connected to one end of the casing adapted to charge the chambers with compressed air, and pressure valves in said diaphragms adapted to be opened when the air pressure in the chambers has arrived at a predetermined point, the equalization of air pressure in the chambers being adapted to close the inlet port and open the exhaust.

4. A device of the character described comprising end casings, said casings being connected by a valve casing, a slide valve in said valve casing, the wall of said casing having an air port extending therethrough communicating with the brake cylinder, an exhaust port in said wall adapted to be opened and closed by said sliding valve, a reciprocating valve adapted to close the inlet port, a flexible diaphragm secured in the end casings, metallic plates disposed upon the opposite faces of said diaphragm and secured thereto, the stem of said sliding valve and of the reciprocating valve being rigidly disposed through said plates and diaphragms, said diaphragms providing end chambers and an intermediate chamber, a pressure valve disposed through each of said diaphragms, a supply pipe having communication with one of said casings adapted to charge the chambers with compressed air, the pressure of the air in the first of said chambers being adapted to open the pressure valve and maintain the same in open position until each of the chambers has received a charge of equal pressure, the reduction of the air pressure in the supply pipe being adapted to reduce the pressure in one of the chambers to open the inlet port and admit the air to the brake cylinder, the pressure in the other of the end chambers being adapted to operate the sliding valve to close the exhaust port.

5. A device of the character described comprising end casings, a valve casing integrally formed with said end casings, said valve casing having an air passage extending therethrough and opening into one of the end casings, said port having the brake cylinder communicating therewith, a reciprocating valve normally closing the inner end of the air port, an exhaust port in said valve casing, a sliding valve adapted to open and close said exhaust port, flexible diaphragms secured between the casing sections, an auxiliary reservoir connected to the central valve casing, said sliding valve and reciprocating valve being rigidly connected to and movable with the diaphragms, a supply pipe connection on one of the end casings, a pressure valve in each of said diaphragms adapted to open under air pressure to admit compressed air to the other chambers and the intermediate chamber and to the auxiliary reservoir, the equalization of the pressure in said chambers being adapted to close communication between the inlet port and the central chamber, and to open the exhaust port, the reduction of pressure in the train pipe causing the air pressure in the central chamber to open communication through the inlet port to the brake cylinder, the increased pressure in the end chamber provided thereby moving the diaphragm to operate the slide valve and close the exhaust port, the pressure in said chamber being stationary whereby the brakes will be held applied until the air supply is increased to overcome the decreased pressures in said latter chambers.

6. A device of the character described comprising two housings integrally connected, said connecting portion having a communicating passage therein forming a central chamber, a diaphragm secured between the sections of said housings to provide end chambers, valve stems carried by said diaphragms, the connecting portion between said housings having an air inlet port therein, a valve carried by the valve stem in one of said diaphragms normally closing said inlet port, the other of said valve stems carrying a sliding valve member normally disposed over a passage communicating with said port, said member having a recess in its under side, an exhaust port opening into said recess, a supply pipe connected to one of said housings and adapted to supply air thereto, a pressure valve in each of said diaphragms, said valves normally closing communication between the chambers, the valve closing said inlet port being unseated by the air pressure in the central chamber, the increased pressure in the end chamber provided by the exhaustion of the air through said port being adapted to move said slide valve to close the exhaust port whereby the air will be discharged into the brake cylinder, said slide valve retaining such position until the pressures in said chambers are equalized.

In testimony whereof I hereunto affix my signature in the presence of two witnesses.

DAVID H. DOWNEY.

Witnesses:
DEAN SUTCLIFFE,
JOSEPH VOELTE.